US011821449B1

(12) United States Patent
Recker et al.

(10) Patent No.: US 11,821,449 B1
(45) Date of Patent: Nov. 21, 2023

(54) LOCKABLE DOUBLE SHEAR DOWEL CONNECTOR

(71) Applicant: Meadow Burke, LLC, Riverview, FL (US)

(72) Inventors: Michael J. Recker, Palmetto, FL (US); Ronald G. Naumann, Valrico, FL (US); Patrick Pusey, Middletown, MD (US)

(73) Assignee: Meadow Burke, LLC, Riverview, FL (US)

( * ) Notice: Subject to any disclaimer, the term of this patent is extended or adjusted under 35 U.S.C. 154(b) by 368 days.

(21) Appl. No.: 17/105,944

(22) Filed: Nov. 27, 2020

Related U.S. Application Data

(60) Provisional application No. 62/941,052, filed on Nov. 27, 2019.

(51) Int. Cl.
*F16B 13/04* (2006.01)
*F16B 13/12* (2006.01)
*F16B 13/08* (2006.01)

(52) U.S. Cl.
CPC ........ *F16B 13/126* (2013.01); *F16B 13/0891* (2013.01)

(58) Field of Classification Search
CPC .......................... F16B 13/10891; F16B 13/126
See application file for complete search history.

(56) References Cited

U.S. PATENT DOCUMENTS

| 4,781,006 A * | 11/1988 | Haynes | E04B 1/215 52/601 |
| 4,883,385 A * | 11/1989 | Kaler | E01C 23/045 404/47 |
| 5,634,312 A * | 6/1997 | Tolliver | E04B 1/4121 405/152 |
| 5,682,635 A * | 11/1997 | Tolliver | E04C 5/165 404/1 |
| 6,076,995 A * | 6/2000 | Tauchi | E21D 11/083 405/153 |
| 6,354,760 B1 | 3/2002 | Boxall et al. | |
| 7,134,805 B2 | 11/2006 | Yee et al. | |
| 8,209,933 B2 | 7/2012 | Law | |

(Continued)

FOREIGN PATENT DOCUMENTS

DE 4215435 11/1993
DE 9401386 3/1994

(Continued)

OTHER PUBLICATIONS

"Double Shear Dowel by Meadow Burke," Uploaded to Youtube. com by Meadow Burke LLC, Jun. 19, 2015, retrieved from https://www.youtube.com/watch?v=nUv--Nq0Z7I, 2 pages.

(Continued)

*Primary Examiner* — Gary W Estremsky
(74) *Attorney, Agent, or Firm* — Sheridan Ross P.C.

(57) ABSTRACT

The present disclosure provides a lockable double shear dowel connector comprising two guide tubes, two dowels, two sleeves, an open end, and two orifices. The dowels are disposed adjacent to each other and adjacent to a joint between adjacent blocks of building materials. The present disclosure further provides kits and methods for using and installing the connectors disclosed herein.

18 Claims, 14 Drawing Sheets

(56) References Cited

U.S. PATENT DOCUMENTS

| | | | | |
|---|---|---|---|---|
| 8,756,898 B1* | 6/2014 | Backhaus | ............... | E04B 5/023 |
| | | | | 404/47 |
| 9,556,566 B2* | 1/2017 | Sanders | .................... | E01C 5/06 |
| 9,797,139 B2* | 10/2017 | Savard | .................... | E04C 2/044 |
| 10,081,942 B2* | 9/2018 | Berg | ........................ | E04B 1/48 |
| 2005/0036835 A1 | 2/2005 | Shaw et al. | | |
| 2005/0220539 A1* | 10/2005 | Yee | .......................... | E04B 5/04 |
| | | | | 404/40 |
| 2010/0199589 A1* | 8/2010 | Law | ........................ | F16B 21/16 |
| | | | | 52/585.1 |
| 2011/0258958 A1* | 10/2011 | Boxall | .................... | E04B 1/483 |
| | | | | 52/745.21 |
| 2015/0078822 A1* | 3/2015 | Backhaus | ................. | E01C 5/06 |
| | | | | 404/47 |

FOREIGN PATENT DOCUMENTS

| | | |
|---|---|---|
| WO | WO 2009/030940 | 3/2009 |
| WO | WO 2020/037014 | 2/2020 |

OTHER PUBLICATIONS

"MB Lockable Dowel," Uploaded to Youtube.com by Meadow Burke LLC, Apr. 11, 2013, retrieved from https://www.youtube.com/watch?v=NIq_tY9W6HQ, 2 pages.

International Search Report and Written Opinion for International (PCT) Patent Application No. PCT/US2019/046441, dated Nov. 8, 2019, 6 pages.

international Search Report and Written Opinion for International (PCT) Patent Application No. PCT/GB2008/050727, dated Oct. 29, 2009. 8 pages.

* cited by examiner

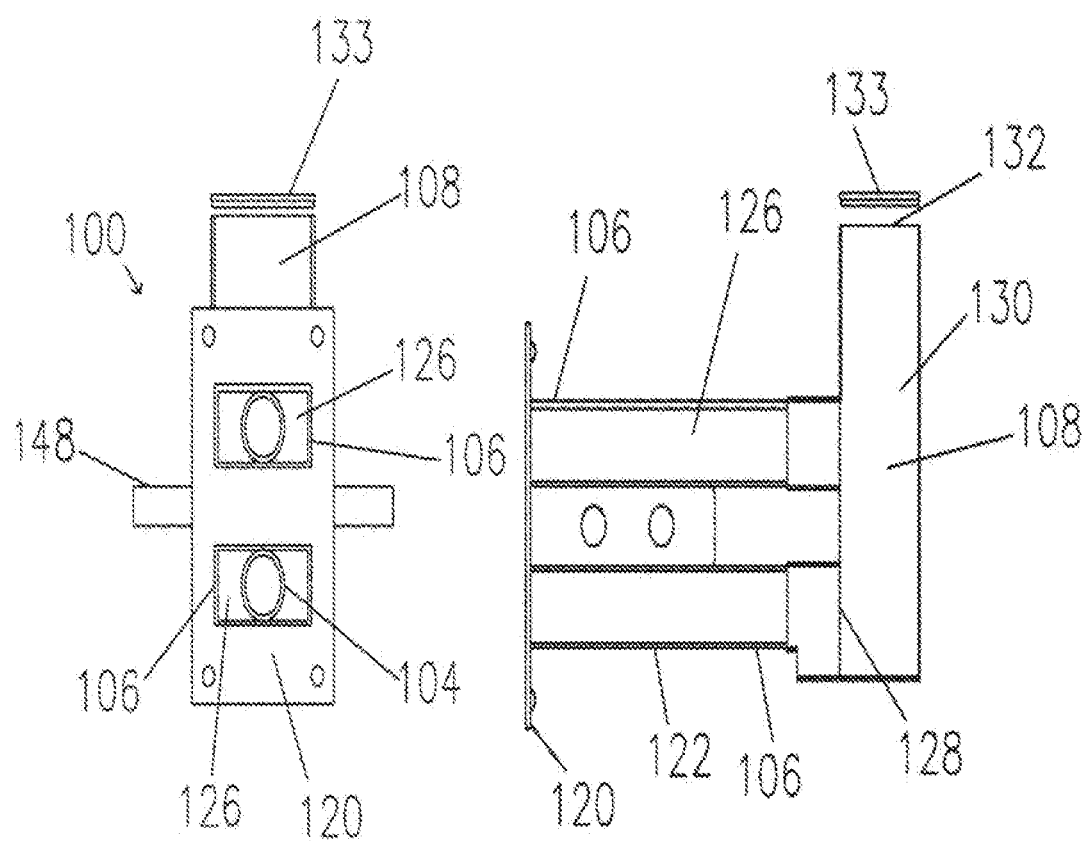

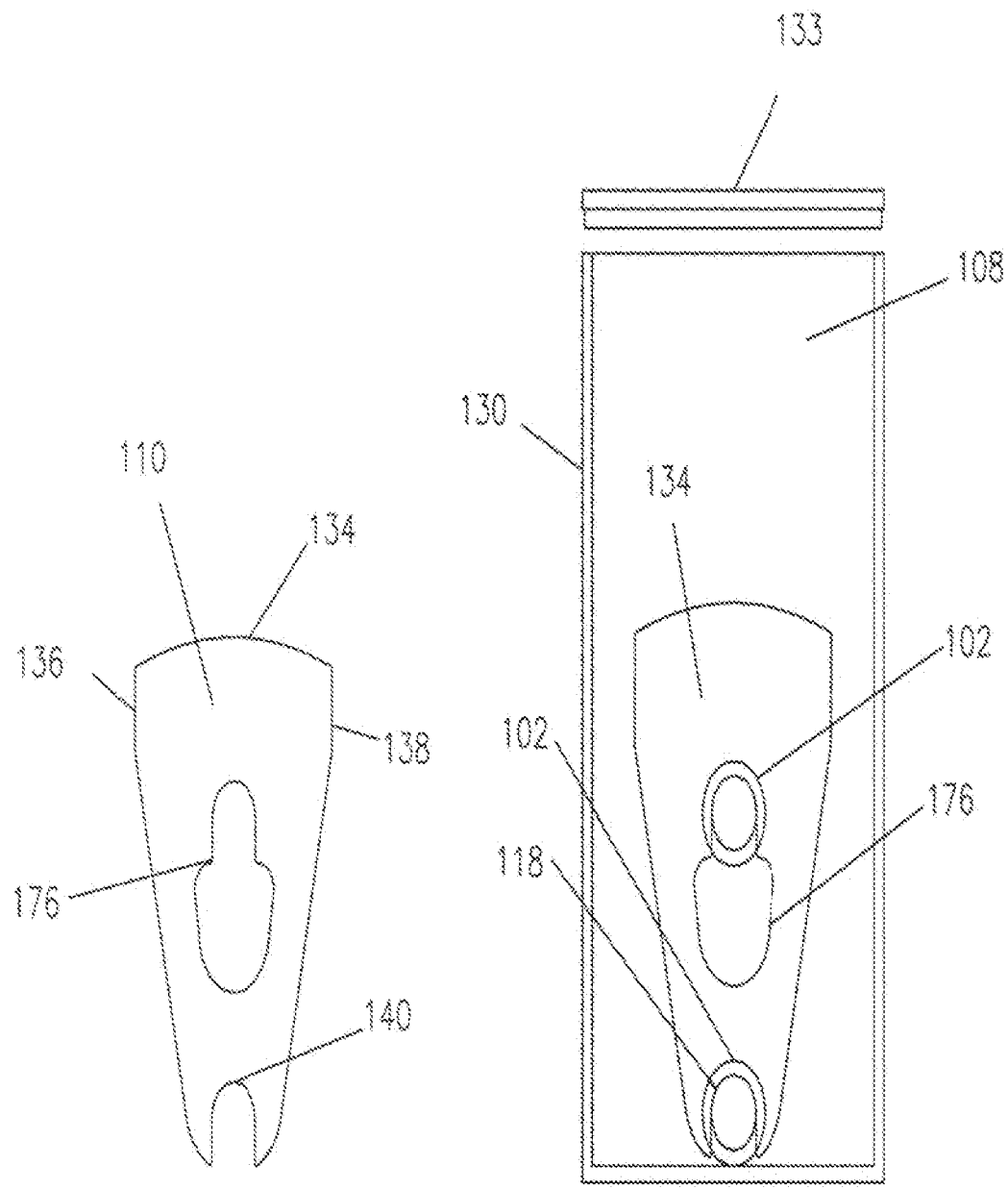

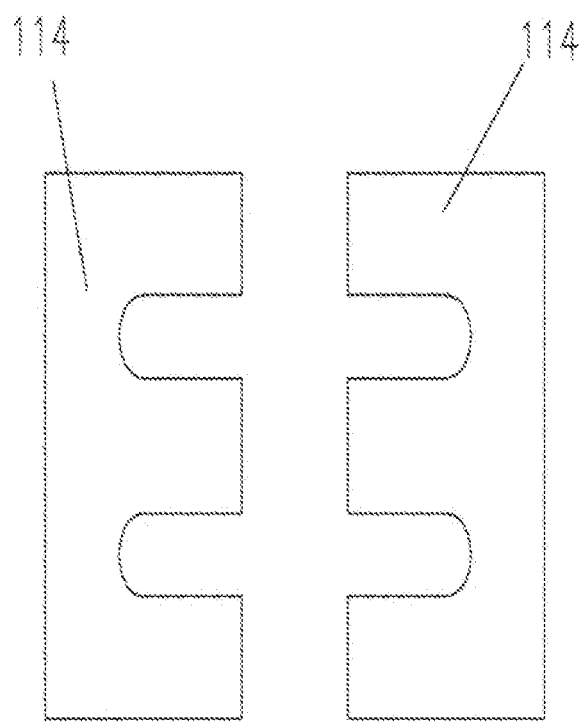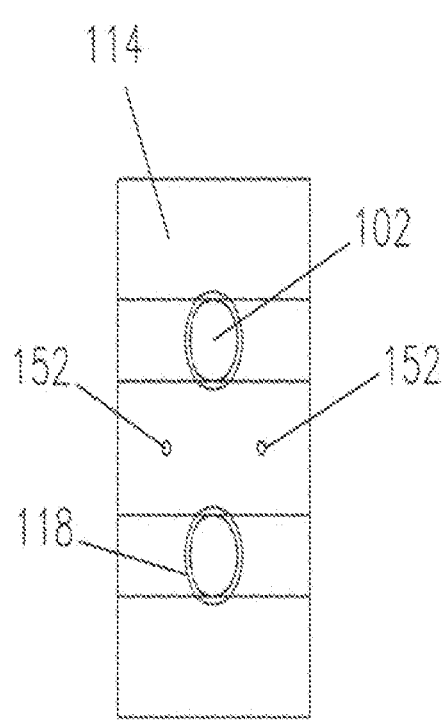
FIG. 11                    FIG. 12

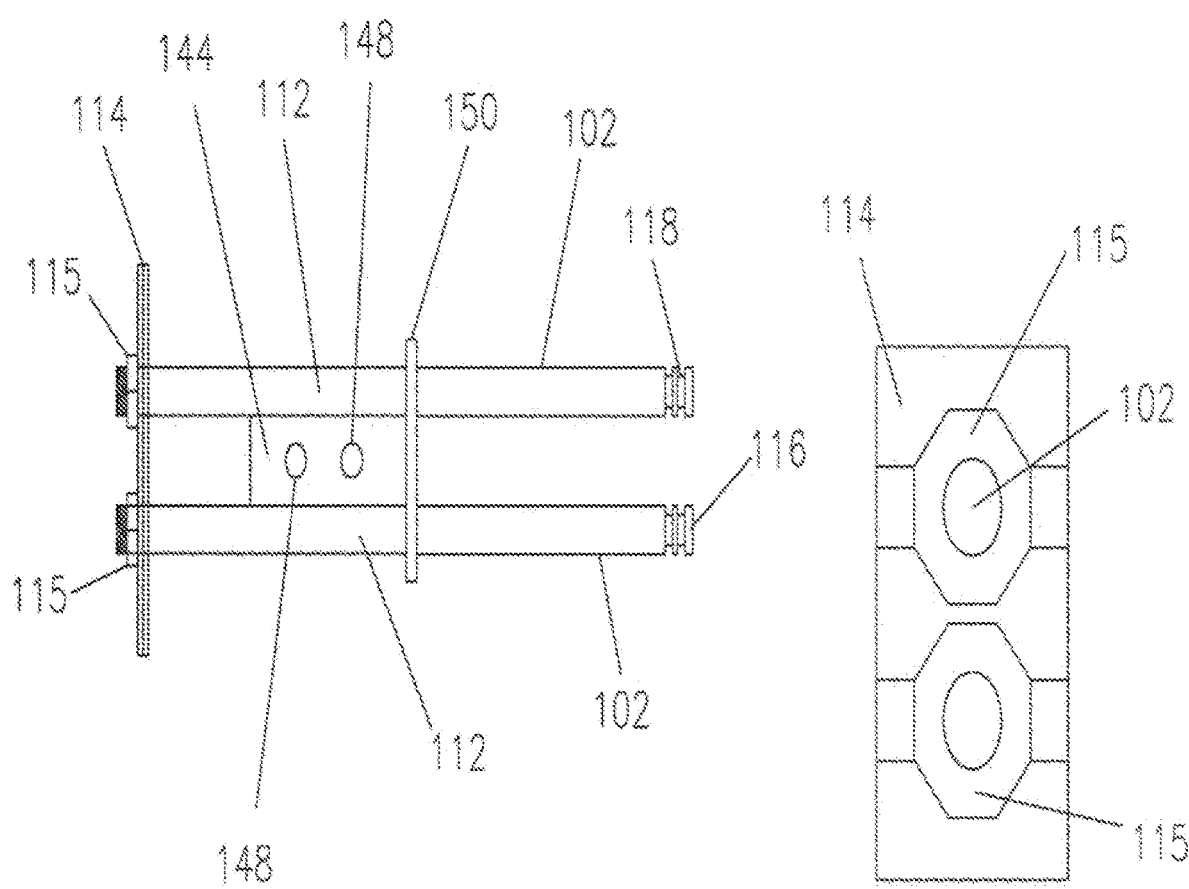

LOCKABLE DOUBLE SHEAR DOWEL CONNECTOR

CROSS-REFERENCE TO RELATED APPLICATIONS

This application claims priority under 35 U.S.C. § 119(e) to U.S. Provisional Patent Application Ser. No. 62/941,052 filed on Nov. 27, 2019, which is incorporated herein in its entirety by reference.

FIELD

This disclosure relates to a connector. More particularly, but not exclusively, it relates to a lockable double shear dowel for transferring shear, moment and tension forces between adjacent blocks of building materials.

BACKGROUND

The typical solution for overcoming shrinkage cracks in concrete slab construction is a pour strip, which is a large temporary gap between concrete slabs that is filled in after the slabs have sufficiently settled. However, pour strips are costly, disruptive, and hazardous to the construction process. By nature they require additional propping and formwork, which disrupts site access and slows the construction process. Dowels can span the gap to support the slabs and eliminate or reduce the size of the gap between slabs. Standard lockable dowels and double shear dowels, as they currently exist, do not have a capacity to resist moment forces. Additionally, double shear dowels offer no tensile capacity. These differences in existing dowels result in these dowels failing to be a direct substitute for a pour strip in many applications. The lack of suitable alternatives causes the loss of quoted projects and revenue.

SUMMARY

The present disclosure provides connectors and related methods that significantly increase the tension capacity over previous devices, define moment capacity absent in previous devices, and are compatible with thin slabs with thickness between, for example, 5" and 7". These connectors reduce cost compared to prior connectors, including a decrease in the amount of stainless steel and epoxy per joint. These devices provide quantifiable tension and moment capacity for each unit. This moment capacity is a direct substitute solution for any conventional pour strip in post tensioned structures, including the large, moment frame designed parking decks. With reduced cost per unit, installation is faster, simpler and safer. A shrinkage joint can be converted with a cost-effective mixture of connectors. Thus, these connectors represent an engineered solution that can eliminate any conventional pour strip and finally become the industry standard for mitigating slab shrinkage and restraint-to-shortening cracks in post-tension elevated slab construction.

It is an aspect of the present disclosure to provide a connector comprising: two guide tubes, each having a width and being disposed adjacent to each other and adjacent to a joint between adjacent blocks of building materials; two dowels each passing between the adjacent blocks of building materials and each having a width, a first end, a second end, the second end of each dowel configured to be received by each guide tube and to allow longitudinal movement of the two dowels in the two guide tubes; two sleeves configured to receive the two guide tubes and to allow for lateral and rotational movement of the two dowels, each sleeve having a lateral sleeve width in excess of the width of each guide tube; a fixing chamber coupled to the two sleeves; an open end configured to receive a fixing means adapted to restrict motion of the dowels within the guide tubes; and two orifices configured to receive the second ends of each dowel.

The present disclosure further provides a method comprising fixing a fixing means in the fixing chamber to restrict the motion of the dowels within the guide tubes of any connector disclosed herein having at least longitudinal movement of the dowels in the guide tubes. The present disclosure also provides a kit of parts comprising any connector disclosed herein. The present disclosure provides a kit for retrofitting a fixing chamber to a known connector, the kit comprising any connector disclosed herein.

One particular embodiment of the present disclosure is a connector for joining two concrete structures, comprising a chamber connected to a first sleeve and to a second sleeve, wherein the chamber has an opening at an upper end; a first dowel positioned in the first sleeve such that the first sleeve constrains movement of the first dowel in one direction; a second dowel positioned in the second sleeve such that the second sleeve constrains movement of the second dowel in the same direction as the first dowel, wherein proximal ends of the first and second dowels extend into the chamber and opposing distal ends of the first and second dowels extend out of the first and second sleeves, and the distal ends are configured to extend across a gap from one concrete structure to another concrete structure; and a lock device that is configured to pass through the opening and into the chamber to selectively connect to a first lock feature of the first dowel and a second lock feature to secure the proximal ends of the first and second dowels within the chamber.

In some embodiments, the first sleeve and the second sleeve are in a vertical configuration, and the first sleeve constrains movement of the first dowel in a vertical direction and the second sleeve constrains movement of the second dowel in the vertical direction. In various embodiments, the lock device is a plate with an aperture that extends through the plate and a slot that extends into an outer perimeter of the plate, the first and second lock features are recesses where an edge of the aperture extends into the recess of the first lock feature and an edge of the slot extends into the recess of the second lock feature to selectively connect the plate to the first and second dowels. In some embodiments, wherein an upper portion of the aperture has a smaller width that a lower portion of the aperture, and the width of the upper portion is substantially equal to a width of the slot. In various embodiments, the edge of the aperture and the recess of the first lock feature have a common radius of curvature, and the edge of the slot and the recess of the second lock feature have a common radius of curvature.

In some embodiments, the lock device comprises a plate with a slot extending upwardly into an outer perimeter of the plate and a pin extending downwardly from the plate into the slot, wherein the first and second locking features are each a recess and an aperture through the first and second dowel, and an edge of the slot extends into at least a portion of the recesses of the first and second dowels, and the pin extends through the apertures of the first and second dowels to selectively connect the plate to the first and second dowels. In various embodiments, the connector further comprises a first guide tube positioned in the first sleeve and the first dowel positioned within the first guide tube; and a second guide tube positioned in the second sleeve and the second dowel positioned within the second guide tube.

Another particular embodiment of the present disclosure is a method for locking a connector between concrete structures, comprising: (i) positioning a first dowel in a first sleeve of the connector and a second dowel in a second sleeve of the connector, wherein a chamber is connected to the first and second sleeves; (ii) pouring a first concrete structure around the connector and pouring a second concrete structure around distal ends of the first and second dowels such that a gap is between the first and second concrete structures; (iii) connecting a lock plate to proximal ends of the first and second dowels wherein an edge of an aperture in the lock plate is positioned in a recess in the first dowel and an edge of a slot in the plate is positioned in a recess in the second dowel; and (iv) pouring a curable material into the chamber to fix the positions of the first and second dowels and the lock plate within the chamber.

In some embodiments, the method further comprises (v) securing the connector to a first formwork, and securing the distal ends of the first and second dowels to a second formwork. In various embodiments, the method further comprises (vi) extending the lock plate through an opening on an upper end of the chamber. In some embodiments, the method further comprises (vii) providing a plate connected to both a distal end of the first sleeve and a distal end of the second sleeve to support the first and second sleeves. In various embodiments, the method further comprises (viii) settling the first and second concrete structures for a time period greater than twenty eight days until the concrete material of the first and second concrete structures is cured.

Another particular embodiment of the present disclosure is a connector for joining two concrete structures, comprising a chamber connected to a first sleeve and a second sleeve, wherein the chamber has an opening at an upper end; a first dowel positioned in the first sleeve such that the first sleeve constrains movement of the first dowel in one direction; a second dowel positioned in the second sleeve such that the second sleeve constrains movement of the second dowel in the same direction as the first dowel, wherein proximal ends of the first and second dowels extend into the chamber; a first plate connected to distal ends of the first and second sleeves to support the distal ends of the first and second sleeves; a second plate connected to the first and second sleeves between distal ends and proximal ends of the first and second sleeves, wherein the first plate and the second plate are oriented substantially perpendicular to each other; and a retention device that is configured to pass through the opening and secure the proximal ends of the first and second dowels within the chamber.

In some embodiments, at least one projection extends from the second plate to anchor the connector in the first concrete structure. In various embodiments, the first sleeve and the second sleeve are in a horizontal configuration, and the first sleeve constrains movement of the first dowel in the vertical direction and the second sleeve constrains movement of the second dowel in the vertical direction. In some embodiments, the retention device is a plate that has a first slot and a second slot that extend into a lower portion of the plate, and an edge of the first slot extends into a recess of the first dowel and an edge of the second slot extends into a recess of the second dowel to selectively connect the plate to the first and second dowels.

In various embodiments, the connector further comprises a curable medium positioned in the chamber to fix a position of the first dowel, the second dowel, and the retention device in the chamber. In some embodiments, the connector further comprises an anchor selectively engaged to the distal end of the first dowel, wherein the anchor has a portion with a larger cross-sectional area than the first dowel. In various embodiments, the connector further comprises a third plate connected to the distal ends of the first and second dowels to fix the first and second dowels in a parallel orientation. In some embodiments, the connector further comprises a fourth plate connected between the distal and the proximal ends of the first and second dowels, wherein the fourth plate is oriented substantially perpendicular to the third plate.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

FIG. 2 is a partially exploded front elevation of the shear connector of FIG. 1.

FIG. 3 is a cross-section of the sleeves of the shear connector of FIGS. 1 and 2.

FIG. 7 is a front elevation of a double locking plate of the shear connector of FIGS. 1 and 2.

FIG. 8 is sectional view of dowels of the shear connectors of FIGS. 1 and 2 in locked position.

FIG. 11 is an end view showing the two plates of the shear connectors of FIGS. 1 and 2 used to form a distal end formation on the dowels.

FIG. 12 is an end view of a proximal end formation of the shear connectors of FIGS. 1 and 2.

FIG. 13 illustrates alternative fixed end structures for the shear connectors of the above embodiments.

FIG. 14 is an end view of the alternative fixed end structures for the shear connectors.

Figure 1:
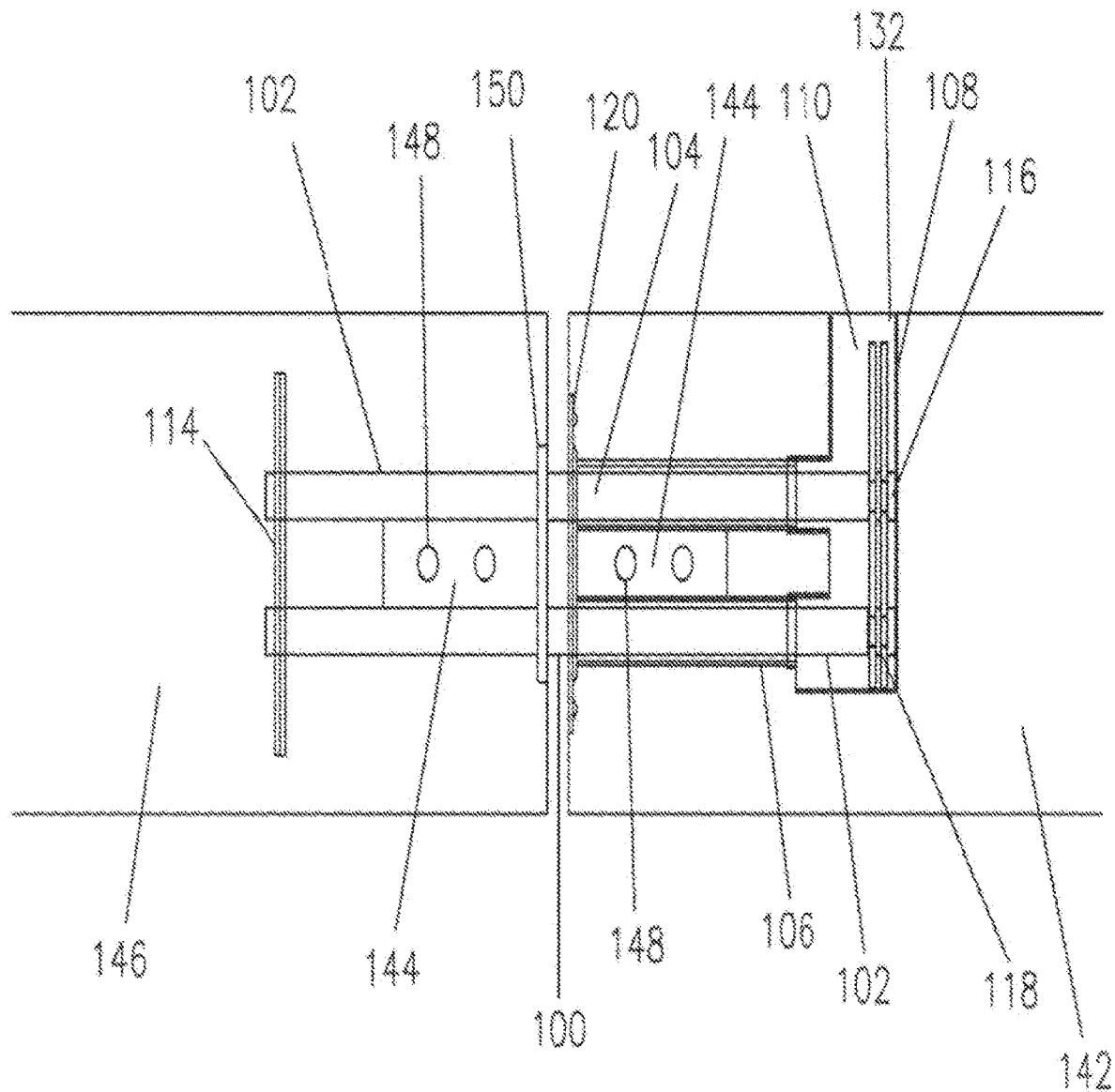
FIG. 1 is a sectional representation of an embodiment of a shear connector.
Figures 4, 5:
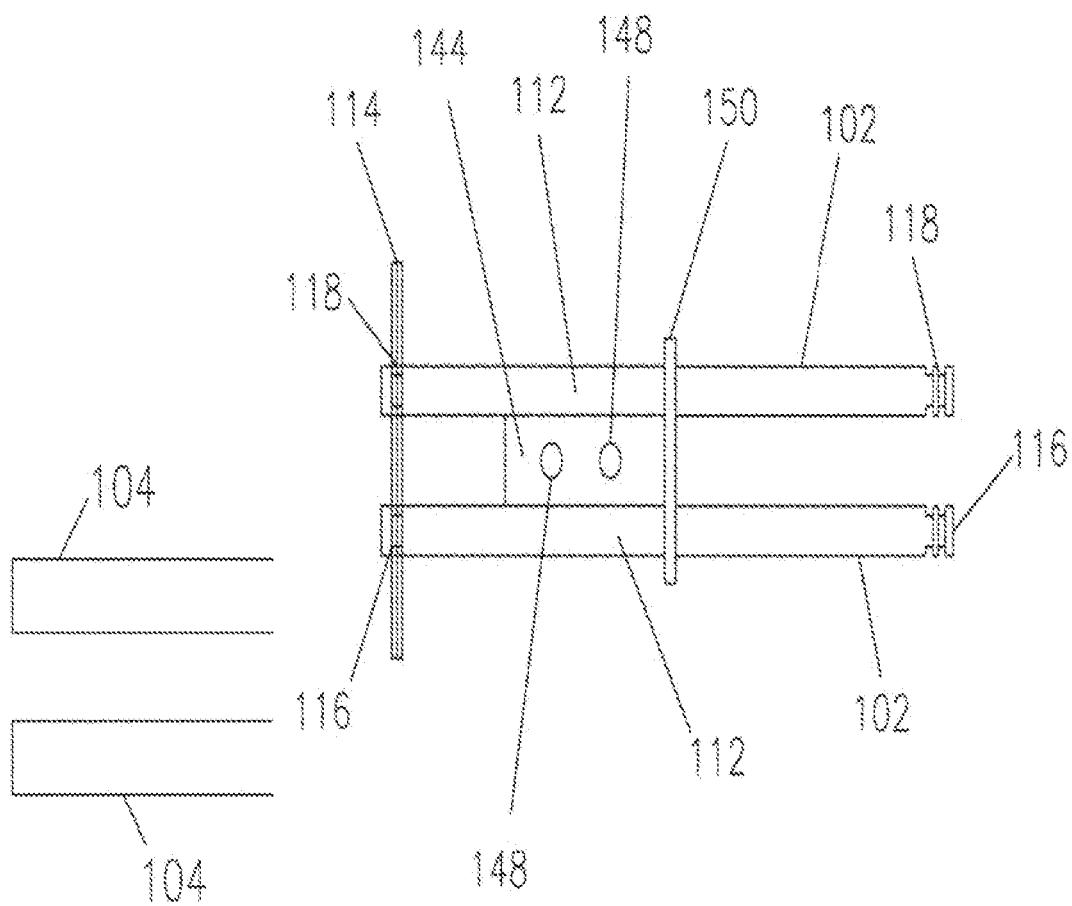
FIG. 4 is a side elevation of the guide tubes of the shear connector of FIGS. 1 and 2.
FIG. 5 is a side elevation of the dowels comprising the shear connector of FIGS. 1 and 2.
Figure 6:
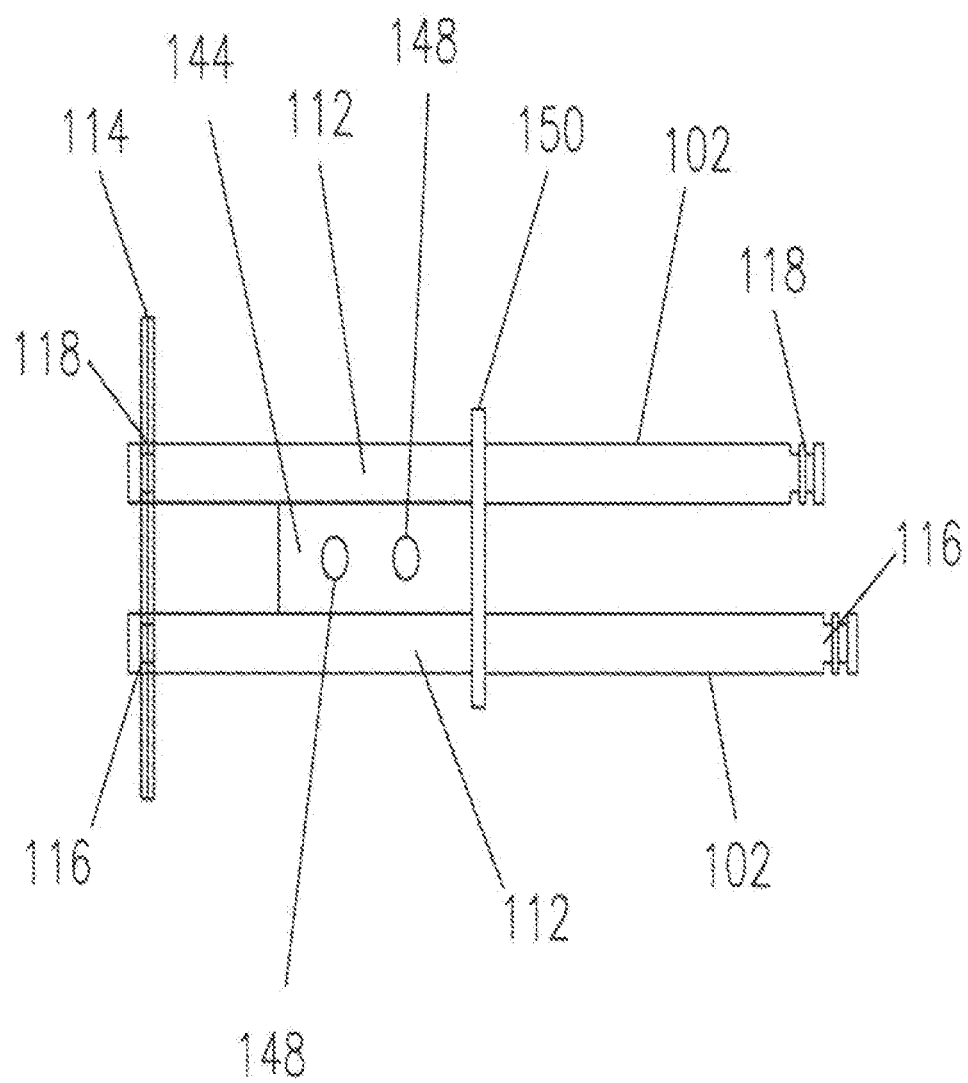
FIG. 6 is a side elevation view of an alternative embodiment of dowels of FIG. 5, comprising dowels of different lengths.
Figure 9:
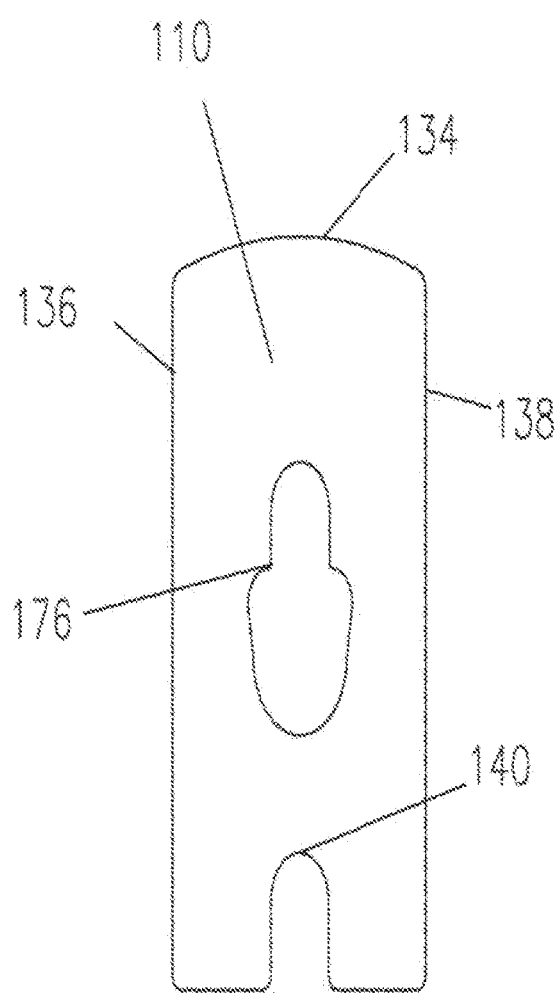
FIG. 9 is a front elevation of an alternative embodiment of a double locking plate of a shear connector, having an overall rectangular shape.
Figure 10:
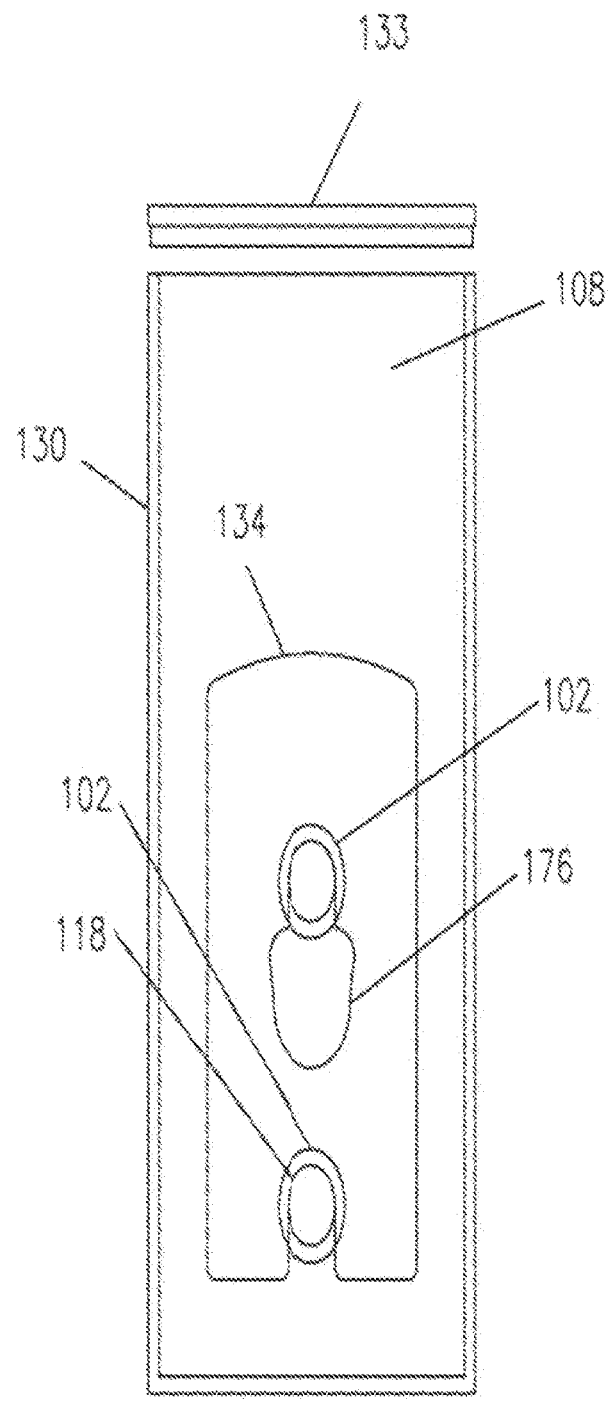
FIG. 10 is sectional view the double locking plate of FIG. 9 in a locked position on the dowels of a shear connector.
Figures 15, 16:
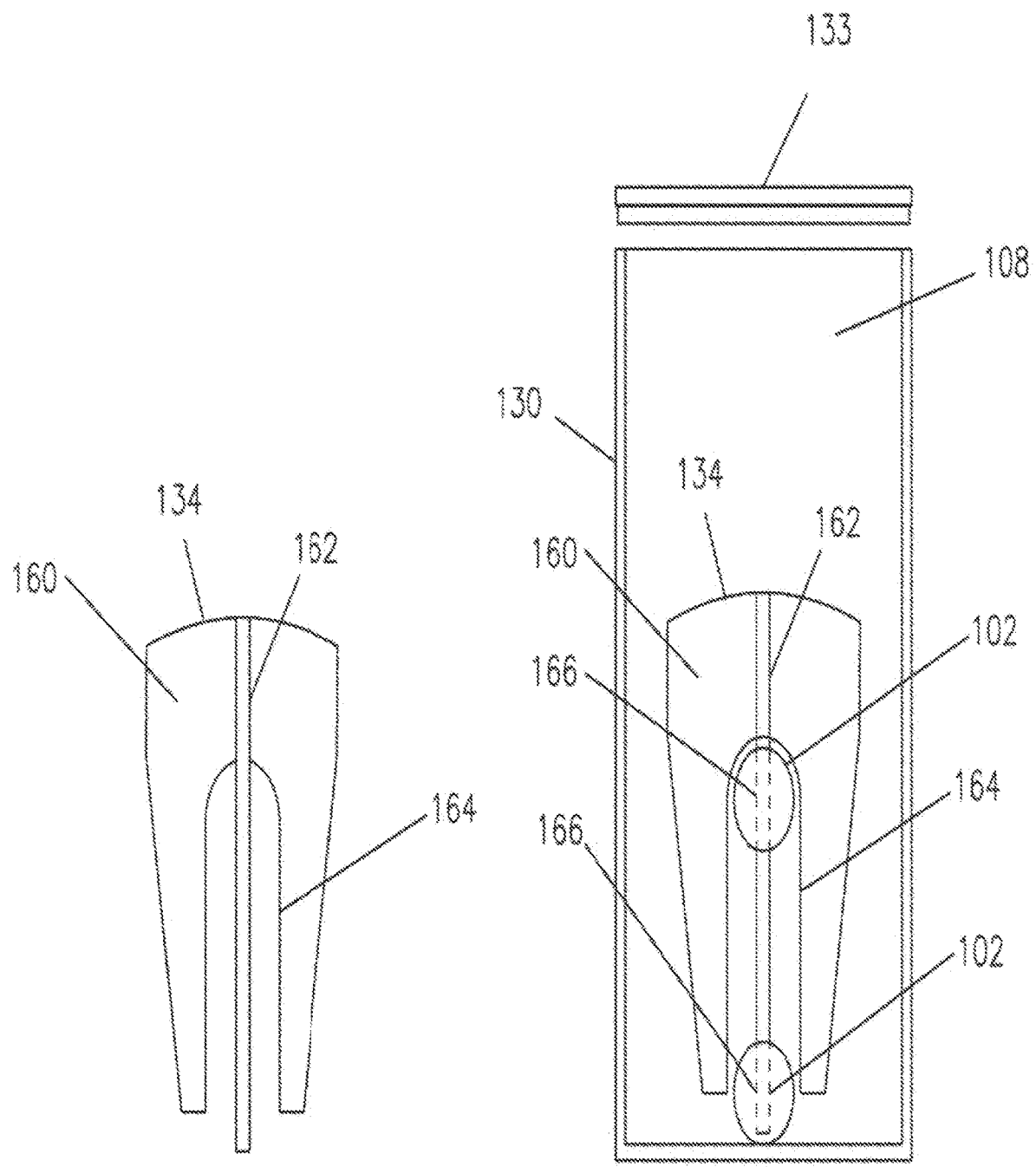
FIG. 15 is an end view showing a locking plate comprising an affixed locking pin bisecting an indexing slot with vertical sides. In this embodiment, the locking pin extends beyond the vertical sides of the indexing slot.
FIG. 16 illustrates the locking plate of FIG. 15 engaging the double dowels in the fixing means.
Figure 17:
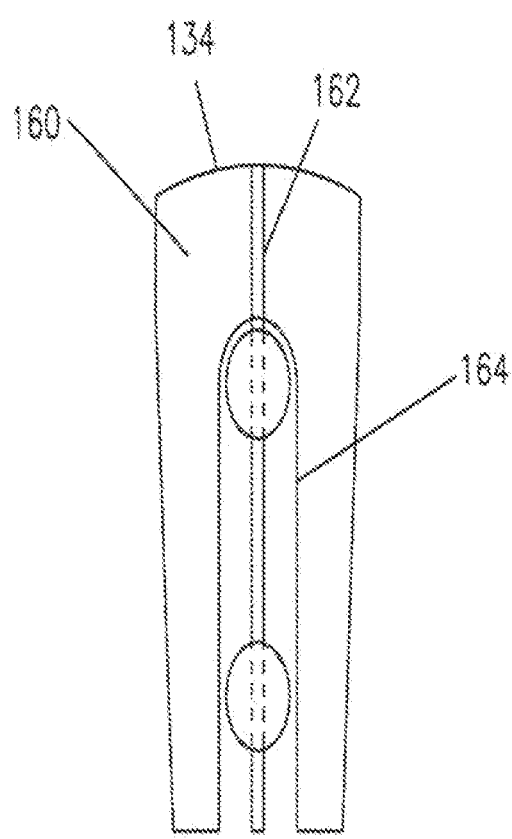
FIG. 17 is an end view showing an alternative embodiment of a locking plate comprising an affixed locking pin bisecting an indexing slot with vertical sides. In this embodiment, the locking pin is the same length as the vertical sides of the indexing slot.
Figure 18:
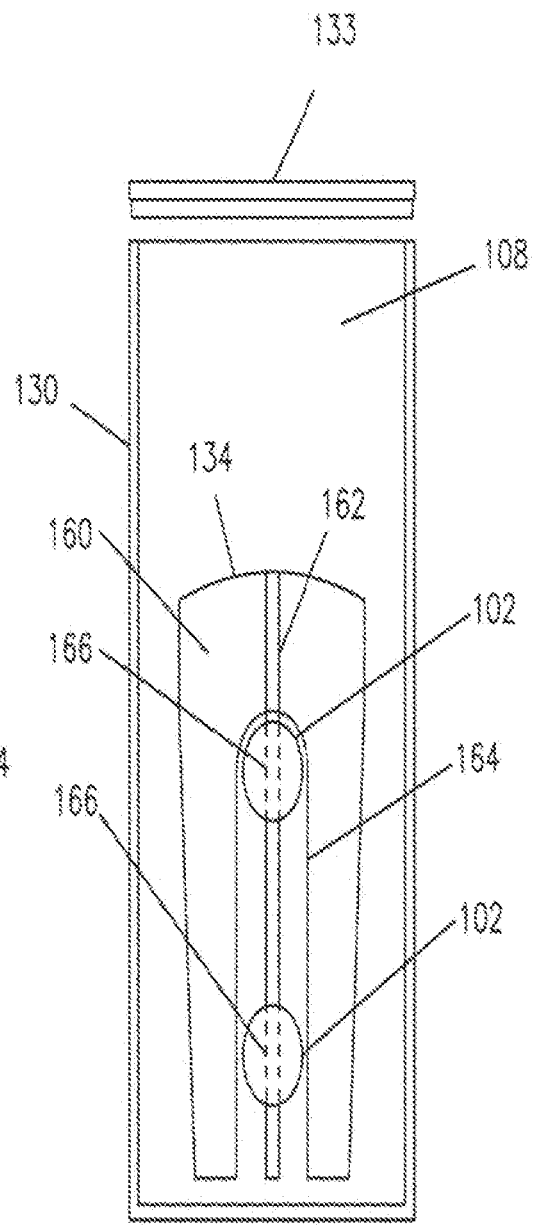
FIG. 18 illustrates the locking plate of FIG. 17 engaging the double dowels in the fixing means.
Figure 19:
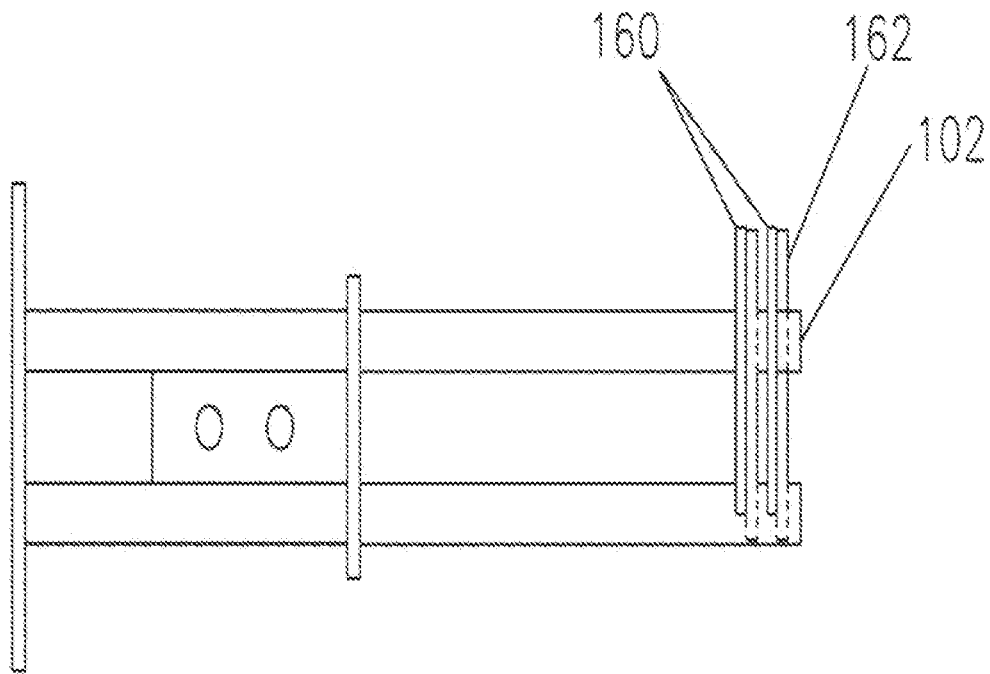
FIG. 19 is a side view of a connector comprising the locking plate of FIGS. 15 and 16 engaged at the distal end.
Figure 20:
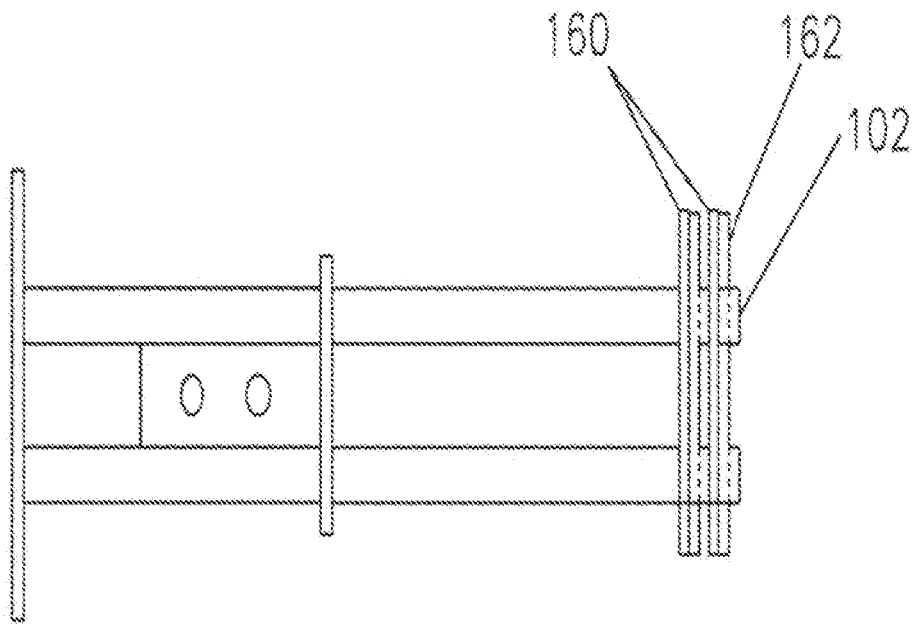
FIG. 20 is a side view of a connector comprising the locking plate of FIGS. 17 and 18 engaged at the distal end.
Figure 21:
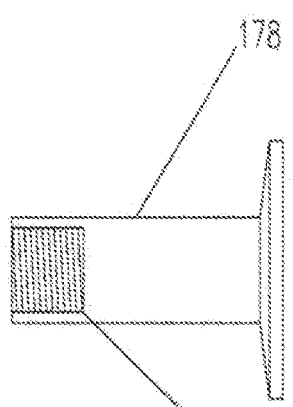
FIG. 21 is side view of a wall anchor comprising a central bore threaded to receive the lockable dowel.
Figure 22:
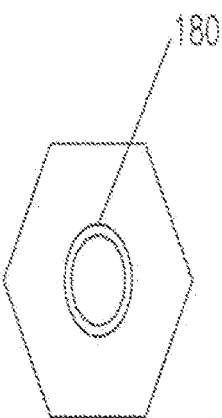
FIG. 22 is an end view of the wall anchor of FIG. 21.
Figure 23:
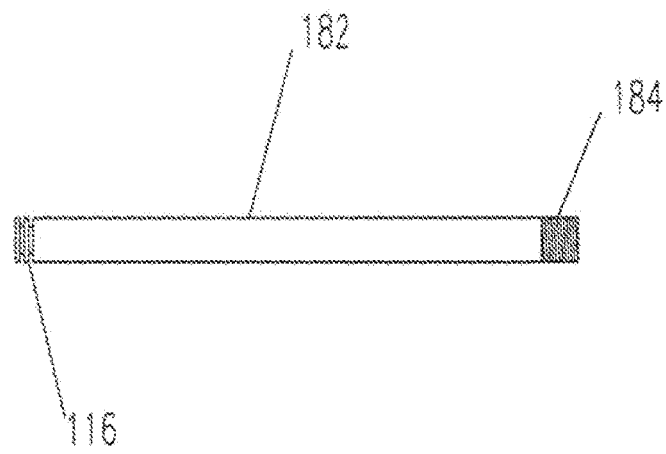
FIG. 23 is a side view of a dowel threaded at one end to engage the central bore of the wall anchor of FIG. 21 and slotted at the other end to engage a locking plate in a locking chamber.
Figure 24:
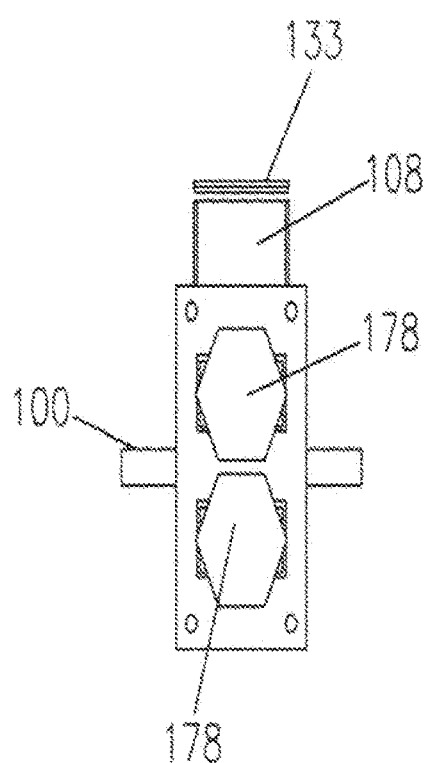
FIG. 24 is an end view of a connector attached to two wall anchors of FIG. 21.
Figure 25:
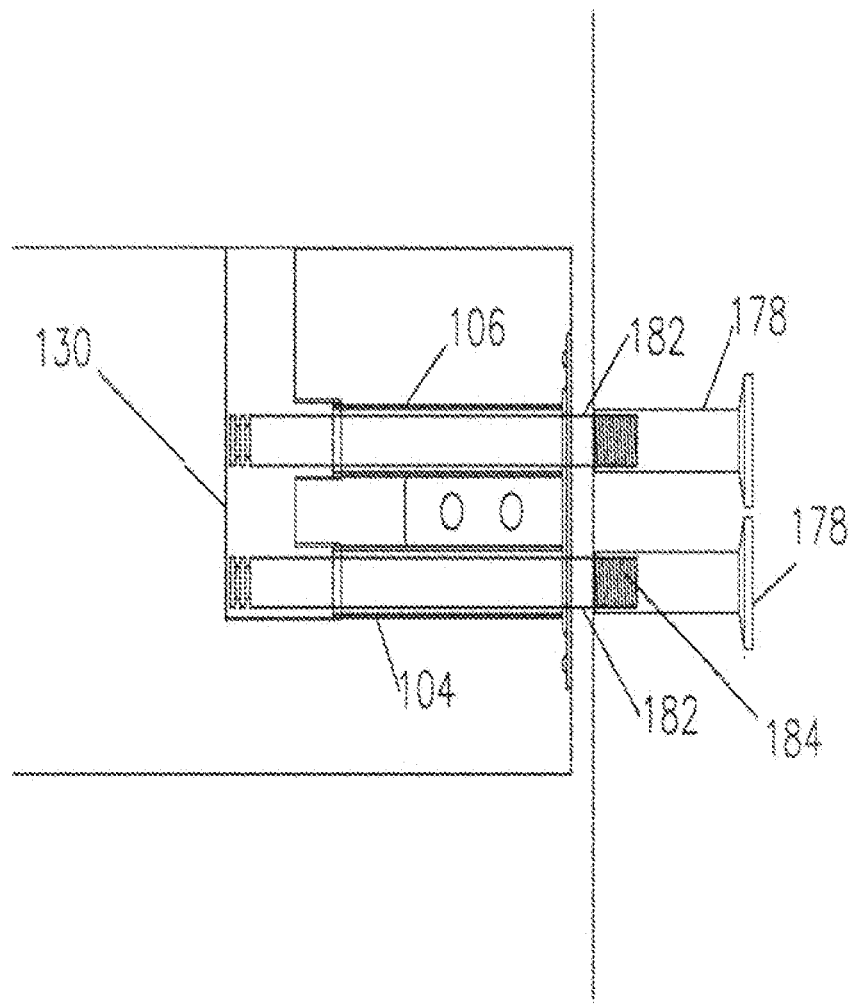
FIG. 25 is a side view of the connector and wall anchors of FIG. 24.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures depict a lockable dowel, and methods and systems for using the same, the present disclosure is not limited to these embodiments. In addition, terms such as "approximately" and "substantially" can mean a variation of +/−10% on a relative basis.

Provided herein is a connector comprising a pair of guide tubes, and a pair of dowels, the guide tubes being arranged to receive an end of the dowels, characterized by the ends passing through the guide tubes into a fixing chamber via an orifice. In certain embodiments, the two guide tubes each have a width and are disposed adjacent to each other and adjacent to a joint between adjacent blocks of building materials. In certain embodiments, two dowels each pass between the adjacent blocks of building materials and each have a width, a first end, a second end. In certain embodiments, the second end of each dowel is configured to be received by each guide tube and to allow longitudinal movement of the two dowels in the two guide tubes. In certain embodiments, two sleeves are configured to receive the two guide tubes and to allow for lateral and rotational movement of the two dowels. In certain embodiments, each sleeve has a lateral sleeve width in excess of the width of each guide tube. In certain embodiments, a fixing chamber is coupled to the two sleeves. In certain embodiments, an open end is configured to receive a fixing means adapted to restrict motion of the dowels within the guide tubes. In certain embodiments, two orifices configured to receive the second ends of each dowel.

A standard shear connector, or dowel, is designed to transfer vertical shear and sometimes horizontal shear across a joint between blocks of building materials, for example concrete floor slabs or concrete beams. Typically, dowels are circular cross-sectioned rods, although other cross-sectional shapes can be used. Such shear connectors simplify the construction of structures by removing keyed joints, double columns and corbel supports. Some shear connectors also allow longitudinal movement in the direction of a main dowel. This is achieved by locating the dowel within a sleeve which has an internal diameter slightly larger than that of the dowel.

Traditionally, these dowels transfer shear across construction and movement joints in concrete. Such joints can be at, or below, ground level where continuity in the slab is necessary to resist large earth pressure loads applied to the structure once the temporary ground anchors in the shoring are destressed. The dowels are often either cast or drilled into the concrete. A single row of short thick dowels provides reasonable shear transfer but demands additional accuracy during construction. Skewed installation of dowels can concentrate stress, spalling the concrete. Where dowels are used across expansion and contraction joints, half the length of the bar is debonded to allow movement. Dowelled joints either require formwork to be drilled for the dowels to pass through, or concrete to be drilled for dowels to be resin-fixed in one side. At movement joints, dowels are accurately aligned in both directions to permit movement; otherwise cracking is likely. Plain dowels are not effective across joints wider than ⅜".

A particular type of shear connector allows lateral and longitudinal movement to occur. This is achieved by introducing a rectangular box section sleeve with has an internal height slightly larger than the external diameter of the tubular sleeve. The tubular sleeve is centered within the rectangular box to ensure that movement can occur in either direction. Vertical shear loads transfer across the joint in the standard manner for a simple dowel shear connector.

Several dowel systems transfer shear loads in concrete construction, such as the lockable dowel (for example manufactured by Ancon, UK and distributed by Meadow Burke USA). While this product generally operates to mitigate pour strips, it does not transfer common loadings in concrete construction. Lockable dowels are used at temporary movement joints, most commonly found in post-tensioned concrete frames. These dowels allow initial shrinkage of the concrete and are then locked in position with a mechanical plate and epoxy resin, generally between 28 and 120 days. The locked dowels continue to transfer shear but prevent further movement.

The lockable double shear dowels herein save considerable time and materials over other construction methods. The connectors disclosed herein improve site access, minimize formwork, and accelerate the rate of construction. With the connectors herein, slabs are propped less or a support corbel is not needed, as shear load is transferred by the double dowels. The time saved by early removal of slab props can be significant.

In certain embodiments, the lockable double shear dowel herein efficiently transfers loadings in the horizontal and vertical directions and restricts movement in the longitudinal direction. The lockable double shear dowel offers significant advantages over plain dowel bars and previous double shear dowels or lockable dowels. They are more effective at transferring load and accommodating movement. Due to their two-part construction, double shear dowels are simpler to install than are plain dowels. Each connector is a two-part assembly comprising a pair of sleeves and a pair of dowel components. Installation is fast and accurate. Drilling formwork or concrete is not required. The sleeve is nailed to the formwork ensuring subsequent alignment with the dowel for effective movement. The dowel components can move longitudinally within the sleeves to accommodate movement.

For example, in certain embodiments in a typical section of pour strip of 12 linear feet, a lockable double shear dowel described herein is placed at about every three linear feet. To achieve the same tensile and sheer load capacity, four previous lockable single dowels would be required in the same 12-foot section. In contrast, based on an increase in tension over the existing lockable dowel, one lockable shear dowel could be used every 10 to 12 feet, instead of one every 3 feet. Between a third and a quarter of the number of devices are needed to achieve the same effect.

Many devices compete for space within blocks of building materials, such as concrete slabs. These devices include but are not limited to post-tensioning cables, reinforcing steel, tiebacks, and other elements. The connectors disclosed herein provide several advantages over previously-known connectors, including for example having less weight, a narrower width, a greater span, and a double locking plate. The weight of each connector is reduced, which simplifies installation. In certain embodiments, the connector is narrower than previously-known connectors, which significantly relieves congestion among elements within the blocks of building materials. In other embodiments, the connectors disclosed herein increase the distance between the top and bottom of the assembly of blocks of building materials. This assembly uniformly distributes the vertical shear forces on the connector within the building material. At the same time, when the connector is locked with a fixing means, the connector is exposed to a tension force, which is better distributed in the connectors disclosed herein because of an increased distance between the bottom of the dowel and the top of the double locking plate compared to previously-known connectors. Additionally, under the double dowel arrangement, the material in the blocks are engaged more in the tensile direction by increasing the area of the double locking plate over the previously-known connectors. In certain embodiments, the connector further comprises a double locking plate at the second ends of the dowels.

In certain embodiments, these connectors are manufactured from stainless steel to ensure high corrosion resistance with no requirement for additional protection. It will also be appreciated that the connectors including the dowels can be made from carbon fiber, fiberglass, steel, and combinations thereof. In certain embodiments, the connectors are available in 10 standard sizes and have design capacities from approximately 4,500 lbs. (2,045 kg) to more than 214,000 lbs. (97,300 kg). The larger connectors can be used in joints up to 60 mm wide, while larger joints can be accommodated using special dowels.

In certain embodiments, the device is configured to fit inside slabs that are thinner that about 7 inches, such as less than about 6 inches, or about 5 inches. In these embodiments, the two dowels of the connector are configured to be closer together on top of each other. The device is dimensioned and scaled to accommodate the block of building material into which the device is to be installed.

In certain embodiments, the fixing chamber is arranged to receive a fixing means. The fixing means is arranged to restrict the motion of the dowels within the guide tubes. The connectors disclosed herein allow initial motion of the dowels within the guide tubes while restricting, and in some embodiments preventing, motion of the dowels once the fixing means is received in the fixing chamber, and, where applicable, conditioned or positioned into a fixing configuration.

In certain embodiments, the connector is modified such that the dowels have at least one end provided with guide tubes and fixing chamber assembly to allow the initial motion of the dowels within the guide tubes while restricting motion of the dowels once the fixing means is in place. The other ends are retained in a fixed relationship within a building material during use, for example buried within or in fixed relation to a surface. Thus, in certain embodiments, the dowels have a first end adapted to be so retained in a fixed relationship with a building material and a second end provided with guide tubes and fixing chamber assembly as hereinabove defined.

In one embodiment, the first ends are adapted with a fixing formation retained directly in fixed relation with a building material. In certain embodiments, the first ends are structured to be retained within a building material. In certain embodiments, a formation keys within a setting concrete or like structure. In certain embodiments, the first ends comprise mechanical fixing means to fix in or upon the surface of a building material. Thus, the first ends may be initially fixed in situ, and initial motion of the dowels at the second end only is enabled.

In certain embodiments, the connector is configured to transfer load between adjacent blocks of building materials and, in particular, a shear connector for transferring shear between adjacent blocks of building materials. In certain embodiments, the adjacent blocks of building materials are two concrete slabs. In certain embodiments, the adjacent blocks of building materials are a concrete slab and a well.

In certain embodiments, the fixing chamber is formed integrally with the guide tubes. Here, the provision of the fixing chamber integrally with the guide tubes simplifies installation of the connector into a structure under construction.

The fixing chamber may extend perpendicularly to the longitudinal axis of the guide tubes. In one embodiment, the fixing means comprises a fixing member selectively mechanically engageable with the dowels in the fixing chamber. In certain embodiments, the fixing member may be configured such that fixing is affected simply by its insertion into the fixing chamber. In certain embodiments, the fixing member comprises a secondary fixing or locking action. In certain embodiments, the fixing means comprises an insert structured to engage with a suitably shaped formation on the dowels in the fixing chamber, for example a portion of the insert and a portion of the dowels are complementarily shaped and complementarily threaded.

In certain embodiments, the fixing member comprises a locking device. In certain embodiments, the locking device is selectively positionable between a first unlocked position where the dowels are free to move and a second locked position, whereas the locking device engages the dowels in such manner as to restrict or prevent motion of the dowels. In certain embodiments, a locking device may be configured to lock the dowels once they is placed in position.

In certain embodiments, the fixing means comprises a fixing medium introduced into the fixing chamber. In certain embodiments, the fixing medium comprises a fluid introducible to the fixing chamber in fluid form and curable to a less fluid or set form, thereby fixing the dowels to restrict or prevent motion of the dowels. For example, in certain embodiments, the fixing medium is a curable or settable material capable of being introduced into the fixing chamber in fluid state and curable or settable in situ. In certain embodiments, the fixing medium is introduced to substantially fill residual space in the fixing chamber once the dowels are in situ.

In certain embodiments, the connector comprises a pair of sleeves arranged to receive the guide tubes, the sleeves having a lateral width in excess of that of the guide tubes. In certain embodiments, the guide tubes may themselves comprise a pair of sleeves having a lateral width in excess of that of the dowels.

In certain embodiments, the dowels pass through the guide tubes and into a section of the sleeves. In certain embodiments, the fixing chamber is formed integrally with the sleeves. In certain embodiments, the dowels may pass through the section of the sleeves and into the fixing chamber. When present, such sleeves allow for lateral and rotational movement before a fixing medium is introduced.

In certain embodiments, the connector may comprise intermediate sleeves located between the guide tubes and the sleeves. In certain embodiments, the intermediate sleeves are fabricated from a compressible material, for example a plastics foam material. When present the intermediate sleeves limits the egress of a fixing medium, such as a grout or resin, down the sleeves and into the region of the joint between adjoining blocks of construction material.

In certain embodiments, the fixing chamber comprises a box having an open end, the open end being arranged to receive the fixing medium. In certain embodiments, the fixing chamber comprises a cap arranged to releasably seal the fixing chamber. In certain embodiments, the orifice is remote from the open end. In certain embodiments, the fixing chamber comprises a tube arranged to engage an opening of the box. In certain embodiments, the fixing chamber is removable from the shear connector. A removable fixing chamber is particularly advantageous by allowing the fixing chamber to be a removable form, so that the fixing medium bonds directly with the building structure in which it is retained rather than to the fixing chamber. Such a removable fixing chamber provides better adhesion of the fixing medium to the structure under construction. In certain embodiments, the fixing chamber comprises a plastics material.

In certain embodiments, the dowels comprise a keyed section comprising a keying formation arranged to pass into the fixing chamber. In certain embodiments, the keyed section is arranged to engage with the fixing medium and/or with the fixing member. In certain embodiments, the keyed section is located at the second end of the dowels. In certain embodiments, the keying formation comprises one or more features chosen from groove, step, channel, sawtooth, waisted section, frustoconical section, frustoconical keying, screw-thread, and nut arrangement. In certain embodiments, the keying formation extends laterally about the second end of the dowels. In certain embodiments, the second ends of the dowels comprise a screw thread arranged to receive a nut. When present, the keying formation may improve the engagement of the dowels with a fixing medium and thereby improves the locking of the dowels into position. In certain embodiments, the keying formation provides direct mechanical engagement with a fixing member. In certain embodiments, the connector may comprise a locking device. In certain embodiments, the locking device engages the keying formation. In certain embodiments, the locking device may comprise a plate. In certain embodiments, the plate may be arcuate, for example comprising sectors of a circle, rectangular, hexagonal or otherwise polygonal.

In certain embodiments, a locking device may be used with a fixing medium. In such a combination, the locking device transfers any longitudinal tensile and lateral forces from the dowels into the fixing medium within the fixing chamber and aids in the restriction of movement.

In certain embodiments, the fixing medium comprises a grout or a resin. In certain embodiments, the fixing medium is pourable before setting.

In certain embodiments, the pair dowels are disposed in a parallel array and each dowel has a separate guide tube and fixing chamber. In certain embodiments, a common guide tube and/or a common fixing chamber receives the ends of the two dowels.

Of a second aspect disclosed herein there is provided a method of locking the dowels of a connector disclosed herein. The method comprising fixing a fixing means to restrict the motion of the dowels within the guide tubes. In certain embodiments, the method further comprises providing a connector disclosed herein. In certain embodiments, the method further comprises introducing a fixing means into the fixing chamber.

In one embodiment, the fixing means comprises a fixing member selectively engageable with the dowels in the fixing chamber and the step of fixing the fixing means comprises engaging the fixing member with the dowels. In certain embodiments, the fixing means comprises a curable fixing medium and the step of fixing the fixing means comprises introducing fixing medium into the fixing chamber and for example substantially filling the fixing chamber with fixing medium, allowing the fixing medium to harden. The methods disclosed herein are primarily methods of use for connectors disclosed herein. Other features of the methods will be appreciated by analogy.

There is also provided kit of parts for providing a connector disclosed herein, such as the constituent components of the connection for later assembly and use. In certain embodiments, the kit comprises sleeves. In certain embodiments, the kit comprises a fixing medium. In certain embodiments, the kit comprises a fixing means, for example a locking device.

Also provided herein is a kit for retrofitting a fixing chamber to a known connector comprising a fixing chamber. In certain embodiments, the kit comprises dowels comprising a keyed section. In certain embodiments, the keyed section is arranged to engage with a fixing medium and/or with a mechanical fixing means. In certain embodiments, the keyed section is located at the second end of the dowels. In certain embodiments, the keying formation may comprise one or more features chosen from groove, step, channel, sawtooth, waisted section, frustoconical section, frustoconical keying, screw-thread, and nut arrangement. The keying formation may extend laterally about a free end of the dowels.

In certain embodiments, the kit comprises a mechanical fixing member selectively mechanically engageable with the dowels in the fixing chamber, such as a locking device. In certain embodiments, the locking device is adapted to engage the keying formations. In certain embodiments, the locking device comprises a plate. In certain embodiments, the plate may be arcuate, for example comprising sectors of a circle, rectangular, hexagonal or otherwise polygonal.

The kit may comprise a fixing medium. In certain embodiments, the fixing medium comprises a fluid introducible to the fixing chamber in fluid form and curable to a less fluid or a set form. For example, in certain embodiments, the fixing medium is a curable or settable material capable of being introduced into the fixing chamber in fluid state and curable or settable in situ. The fixing medium may comprise a grout or a resin. The fixing medium may be pourable before setting.

The dowels may be selectively fixed per the principles by means of a mechanical fixing member alone or by means of a curable fixing medium alone or by means of a combination thereof.

Examples of embodiments of the present disclosure are provided in the following examples. The following examples are presented only by way of illustration and to assist one of ordinary skill in using the disclosure. The examples are not intended in any way to otherwise limit the scope of the disclosure. Table 1 lists out the reference numerals used in FIGS. 1-9.

TABLE 1

| Reference Numerals | | | |
|---|---|---|---|
| 100 | Shear Connector | 133 | Cap |
| 102 | Dowel | 134 | Convex Arcuate Outer Edge |
| 104 | Guide Tube | 136 | Linear Lateral Edge |
| 106 | Sleeve | 138 | Linear Lateral Edge |
| 108 | Fixing Chamber | 140 | Concave Arcuate Inner Edge |
| 110 | Locking Plate | 142 | First Block of Building Material |
| 112 | Cylindrical Rod | 144 | Web Plate |
| 114 | Fixed Plate | 146 | Second Block of Building Material |
| 115 | Nuts | 148 | Cross Dowels |
| 116 | Keyed Formation | 150 | Guide Plate |
| 118 | Grooves | 152 | Fastener |
| 120 | Facia Plate | 160 | Locking Plate |
| 122 | Hollow Elongate Cover Section | 162 | Locking Pin |
| 126 | Rectangular Opening | 164 | Indexing Slot |
| 128 | Orifice | 166 | Hole |
| 130 | Box | 176 | Keyed Indexing Slot |
| 132 | Open End | 182 | Threaded Dowel |
| 178 | Wall Anchor | 184 | Threads |
| 180 | Internal Threads | | |

Referring now to FIGS. 1 to 20, a shear connector 100 comprises dowels 102, guide tubes 104, sleeves 106, opposing fixed plates 114, web plate 144, cross dowels and a fixing chamber 108. In the present embodiment, a double locking plate 110 is used, although this is not essential. The dowels 102 comprise a pair of cylindrical rods 112 having upset heads with opposing fixed plates 114 at one end and keyed formations 116 at the other ends. The upset heads and opposing fixed plates constitute a fixed mounting, so that an adjustable mounting herein is provided only at the other end in this embodiment. It will be appreciated that this is an example only. Alternative fixed structures are discussed below with reference to FIG. 12.

In certain embodiments, the dowels 102 are 18 mm in diameter and 384 mm long. However, the dowels 102 may have other diameters and lengths, depending on the scale of the connector and the context where it will be used. In certain embodiments, the dowel has a diameter between 12 mm and 60 mm. In certain embodiments, the dowel has a length between 300 mm and 1000 mm. In certain embodiments, the length of each dowel is the same. In certain embodiments, the length of one dowel may differ from the other.

In the present embodiment, the dowels are affixed in alignment using a web plate 144 containing cross dowels 148 and guide plate 150 and various welds.

Formation 116 has a series of grooves 118 passing about the end of the rod 112. In certain embodiments, the grooves 118 are 3 mm deep. In the present embodiment, the keyed formation 116 takes the form of a series of grooves 118 passing about the end of the rod 112. In certain embodiments, the grooves 118 are 3 mm deep, with a pitch of between 10 mm to 60 mm. However, the depth of the grooves 118 may vary depending upon the diameter of the dowels 102. Also, other keyed formations such as step, sawtooth and channels are suitable formations on the dowels 102.

The guide tubes 104 are hollow cylindrical tubes having a diameter suitable to accommodate the dowels 102. Typically, the guide tubes 104 have an inner diameter only slightly larger than that of the dowels 102 to prevent excess relative movement between the two.

The sleeves 106 comprise a facia plate 120, and hollow, elongate cover sections 122. The facia plate 120 opens into the cover sections 122 through rectangular openings 126. The cover sections open into the fixing chamber 108 through a pair of rectangular orifices 128.

The fixing chamber 108 comprises a box 130 that has one open end 132. A cap 133 is provided to close the box 130. The orifices 128 are located adjacent the opposite end of the box 130 from the open end 132. The fixing chamber 108 may be formed integrally with the sleeve 106, attached to the sleeve 106, for example by welding. Alternatively, the fixing chamber 108 may be separable from the sleeve 106, for example a plastics unit, once the chamber is formed within the block of building material.

The double locking plate 110 comprises a convex arcuate outer edge 134, linear lateral edges 136,138 and a concave arcuate inner edge 140. The radius of curvature of the inner edge 140 of the double locking plate 110 is substantially the same as that of the grooves 118 of the keyed formation 116 of the dowels 102.

In use, the upset head/opposing fixed plates 114 are installed into the groove 118 of a keyed formation and joined using a fastener, such as a rivet or a weld, set in a first block of building material 142, typically concrete. A web plate 144 is provided in the illustrated embodiment for added strength of fixing in the concrete and stabilizing the dowels 102. The sleeves 106 and fixing chamber 108 are set in a second block of building material 146 with the open end 132 of the box 130 remaining accessible. The cap 133 can be placed over the open end 132 to ensure this.

The guide tubes 104 located within the cover section 122 of the sleeves 106. The keyed formation 116 of the dowels 102 pass through the guide tubes 104 and into the fixing chamber 108 through the orifice 128. The guide tubes 104 are hollow cylindrical tubes having a diameter suitable to accommodate the dowels 102. The guide tubes 104 have an inner diameter slightly larger that of the dowels 102 to allow for relative longitudinal motion of the dowels 102 once in situ. The sleeves 106 extend laterally to a greater extent than the guide tubes 104. This allows lateral movement of the dowels 102 and guide tubes 104 once in situ. This is illustrated at FIG. 1.

Once initial relative movement of the blocks of building material has occurred, the double locking plate 110 locates into a matched pair of grooves 118 of the keyed formation 116 within the box 130. The embodiment uses a settable fixing or locking medium to fix the dowels. The locking medium is introduced into the box 130 to lock the dowels 102 in position and to prevent further movement. In an example, the locking medium is a pourable grout or resin or a low melting point metal. Other possible materials will readily suggest themselves. The locking medium sets and restricts the motion of the dowels 102, preventing further motion of the dowels 102.

In one embodiment, the fixing medium will fill the box 130 until it is completely full and will fill as much of the cover sections 122 as possible. To reduce the outflow of the fixing medium into the joint, an optional intermediate sleeves (not shown) may lie between the guide tubes 104 and the sleeves 106. The intermediate sleeves may comprise a compressible material, such as foam. The intermediate sleeves may extend only partially about the outer circumference of the guide tubes. It may also only be positioned close to the joint between the two slabs.

Although described with reference to a shear connector 100 comprising a double locking plate 110. In certain embodiments, the keyed formations 116 of the dowels 102 provides sufficient fixing to restrict, or prevent, further motion of the dowels 102. With particular reference to FIG. 12, a pin, welded disc or plate, or a screw threaded free end with a complementarily threaded head or nut are suitable terminations for the distal ends of the dowels 102 and for the opposing fixed plates used in the shear connector 100.

Referring now to FIGS. 15-20, the locking plate 160 may comprise a locking pin 162 affixed to an indexing slot 164 with vertical sides. The locking pin 162 is configured to index vertical holes 166 in both dowels 102 of the shear connector 100, thereby restricting motion of the dowels 102 and preserving tension across the shear connector 100.

In some embodiments, each dowel 102 comprises as a plurality of holes 166 in both dowels in the second ends where the fixing means is applied. For example, the dowels may be about ¾" in diameter, and the amount of dowel extended within the fixing chamber may be about 3", thus permitting three holes spaced about ½" apart starting at ½" from the end. In this example, these three pairs of holes (one hole in each dowel aligned vertically in each pair) accept one or more locking plates. That is, one, two, three, four, or more locking plates can be used. In certain embodiments, two to four locking plates are used. The locking plate 160 of this embodiment has a horseshoe-shaped indexing slot 164 that can easily be dropped over both dowels 102. The locking plate is formed with a locking pin 162 that easily indexes into the holes 166 of both dowels 102. The locking pin 162 is, for example, is formed from stainless steel and is welded to the locking plate 160. Moreover, it is within the skill of a person having skill in the art to configure the locking plate 160 to index a single dowel or a shear connector having only one dowel. In certain embodiments, the locking pin 162 extends beyond the horseshoe-shaped indexing slot 164. In certain embodiments, the locking pin 162 extends is the same length as the horseshoe-shaped indexing slot 164.

In certain embodiments, the fixing means of the connector comprises alternating shear pins and locking plates. For example, a first shear pin is dropped vertically through both dowels. The first shear pin extends above the top dowel to a height that matches the top of a first locking plate. The first locking plate is slid over the dowels against the first shear pin. Then, a second shear pin secures the first locking plate. This arrangement can be repeated for all available pairs of holes in the dowels.

Referring now to FIGS. 21-25, a shear connector 100 may span a joint between a slab and wall. In this embodiment, wall anchor 178 is set into the wall adjacent to the slab. The anchor 178 comprises internal threads 180 adapted to receive threads 184 disposed on a first end of the threaded dowel 182. The second end threaded dowel 182 comprises a keyed formation 116 adapted to receive a locking plate 110 in the fixing chamber 108 of the connector 100. The lockable double shear dowel is a cost-effective solution to eliminate pour strips and has a tensile capacity that is likely to significantly exceed that of the lockable dowel.

Figure 26A:
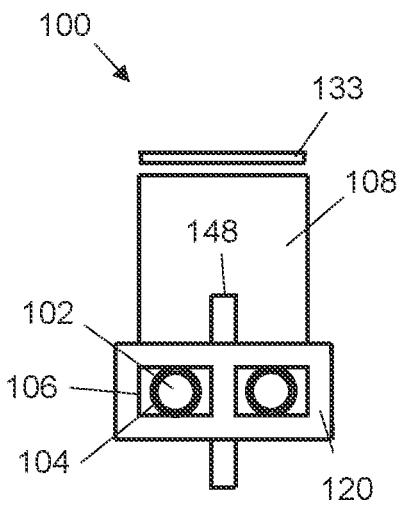
FIG. 26A is a front elevation view of a connector with two dowels in a horizontal configuration.
Figure 26B:
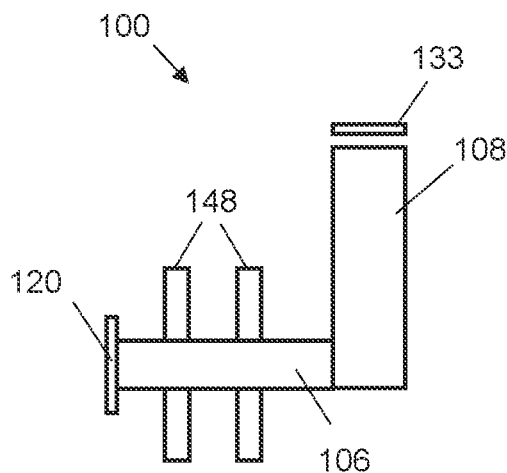
FIG. 26B is a side elevation view of the connector in FIG. 26A.
Figure 26C:
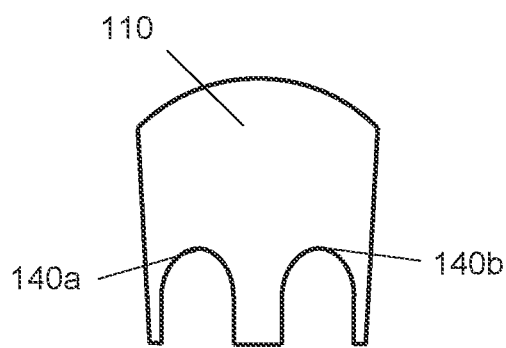
FIG. 26C is a locking plate of the connector in FIG. 26A.

Referring now to FIGS. 26A-26C, various views of a connector 100 in a horizontal configuration, as opposed to the vertical configuration described elsewhere herein, are provided. A connector 100 in a horizontal configuration can be readily incorporated into thin slabs of concrete, such as slabs less than 7" or less than 5". The connector 100 can have two dowels 102 positioned in respective guide tubes 104, which are in turn positioned in respective sleeves 106. As shown, the sleeves 106 are in a horizontal configuration and offset from each other in a horizontal direction. FIG. 26A shows the sleeves 106 constraining the movement of the guide tubes 104 and dowels 102 in a vertical direction, but in other embodiments, the sleeves 106 can constrain movement in another direction.

Like other embodiments described herein, the sleeves 106 are connected to a chamber 108 that generally extends in a vertical direction to an opening that a cap 133 can selectively cover. The depicted chamber 108 is a single, continuous chamber, but it will be appreciated that in some embodiments, the chamber 108 can be separated such that one sub-chamber forms an enclosed volume with one sleeve, and another sub-chamber forms an enclosed volume with another sleeve.

FIG. 26C shows an exemplary lock plate 110, or lock device or retention device, for the connector 100 in a horizontal configuration. The lock plate 110 has two slots extending into a bottom portion of the plate 110, and one slot defines a first arcuate edge 140a and the other slot forms a second arcuate edge 140b. As described elsewhere herein, the arcuate edges 140a, 140b can contact a lock feature of the dowels 102, such as a groove or recess in the dowels 102, to selectively connect the plate 110 to the dowels 102. Then, grout or another curable medium can be poured into the chamber 108 to fix the positions of the dowels 102 and the plate 110 within the chamber 108. Once the grout cures, the connector 100 can take up tension forces across the gap between concrete structures. The horizontal connector 100 can incorporate a plurality of dowels that are connected to each other at their distal ends by a plate or other component or that have freely extending distal ends.

It will be appreciated that while vertical and horizontal configurations of dowels and sleeves are described herein, embodiments of the present disclosure encompass embodiments that combine these principles. For example, one embodiment of a connector has at least three dowels and sleeves with at least two dowels and sleeves in a vertical configuration and at least two dowels and sleeves in a horizontal configuration. The sleeves may constrain all of the dowels in the same, common direction. In other embodiments, the sleeves may constrain the dowels in different directions to resist shear forces in different directions. It will be further appreciated that a given connector in a horizontal configuration can have at least two dowels and sleeves, and a given connector in a vertical configuration can have at least two dowels and sleeves.

While various embodiments have been described, it will be apparent to those skilled in the art once given this disclosure that various modifications, changes, improvements and variations may be made without departing from the scope of the disclosure.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. A connector for joining two concrete structures, comprising:
  a chamber connected to a first sleeve and to a second sleeve, wherein said chamber has an opening at an upper end;
  a first dowel positioned in said first sleeve such that said first sleeve constrains movement of said first dowel in one direction;
  a second dowel positioned in said second sleeve such that said second sleeve constrains movement of said second dowel in the same direction as said first dowel, wherein proximal ends of said first and second dowels extend into said chamber and opposing distal ends of said first and second dowels extend out of said first and second sleeves, and said distal ends are configured to extend across a gap from one concrete structure to another concrete structure; and
  a lock device that is configured to pass through said opening and into said chamber to selectively connect to a first lock feature of said first dowel and a second lock feature of said second dowel to secure said proximal ends of said first and second dowels within said chamber,
  wherein said lock device is a plate with an aperture that extends through said plate and a slot that extends into an outer perimeter of said plate, said first and second lock features are recesses where an edge of said aperture extends into said recess of said first lock feature and an edge of said slot extends into said recess of said second lock feature to selectively connect said plate to said first and second dowels.

2. The connector of claim 1, wherein said first sleeve and said second sleeve are in a vertical configuration, and said first sleeve constrains movement of said first dowel in a vertical direction and said second sleeve constrains movement of said second dowel in said vertical direction.

3. The connector of claim 1, wherein an upper portion of said aperture has a smaller width that a lower portion of said aperture, and said width of said upper portion is substantially equal to a width of said slot.

4. The connector of claim 1, wherein said edge of said aperture and said recess of said first lock feature have a common radius of curvature, and said edge of said slot and said recess of said second lock feature have a common radius of curvature.

5. The connector of claim 1, further comprising:
a first guide tube positioned in said first sleeve and said first dowel positioned within said first guide tube; and
a second guide tube positioned in said second sleeve and said second dowel positioned within said second guide tube.

6. A method for locking a connector between concrete structures, comprising:
positioning a first dowel in a first sleeve of said connector and a second dowel in a second sleeve of said connector, wherein a chamber is connected to said first and second sleeves;
pouring a first concrete structure around said connector and pouring a second concrete structure around distal ends of said first and second dowels such that a gap is between said first and second concrete structures;
connecting a lock plate to proximal ends of said first and second dowels wherein an edge of an aperture in said lock plate is positioned in a recess in said first dowel and an edge of a slot in said plate is positioned in a recess in said second dowel; and
pouring a curable material into said chamber to fix the positions of said first and second dowels and said lock plate within said chamber.

7. The method of claim 6, further comprising securing said connector to a first formwork, and securing said distal ends of said first and second dowels to a second formwork.

8. The method of claim 6, further comprising extending said lock plate through an opening on an upper end of said chamber.

9. The method of claim 6, further comprising providing a plate connected to both a distal end of said first sleeve and a distal end of said second sleeve to support said first and second sleeves.

10. The method of claim 6, further comprising settling said first and second concrete structures for a time period greater than twenty eight days until the concrete material of said first and second concrete structures is cured.

11. A connector for joining two concrete structures, comprising:
a chamber connected to a first sleeve and a second sleeve, wherein said chamber has an opening at an upper end;
a first dowel positioned in said first sleeve such that said first sleeve constrains movement of said first dowel in one direction;
a second dowel positioned in said second sleeve such that said second sleeve constrains movement of said second dowel in the same direction as said first dowel, wherein proximal ends of said first and second dowels extend into said chamber;
a first plate connected to distal ends of said first and second sleeves to support said distal ends of said first and second sleeves;
a second plate connected to said first and second sleeves between distal ends and proximal ends of said first and second sleeves, wherein said first plate and said second plate are oriented substantially perpendicular to each other;
a third plate connected to said distal ends of said first and second dowels to fix said first and second dowels in a parallel orientation; and
a retention device that is configured to pass through said opening and secure said proximal ends of said first and second dowels within said chamber.

12. The connector of claim 11, wherein at least one projection extends from said second plate to anchor said connector in said first concrete structure.

13. The connector of claim 11, wherein said first sleeve and said second sleeve are in a horizontal configuration, and said first sleeve constrains movement of said first dowel in said vertical direction and said second sleeve constrains movement of said second dowel in said vertical direction.

14. The connector of claim 13, wherein said retention device is a plate that has a first slot and a second slot that extend into a lower portion of said plate, and an edge of said first slot extends into a recess of said first dowel and an edge of said second slot extends into a recess of said second dowel to selectively connect said plate to said first and second dowels.

15. The connector of claim 11, further comprising a curable medium positioned in said chamber to fix a position of said first dowel, said second dowel, and said retention device in said chamber.

16. The connector of claim 11, further comprising an anchor selectively engaged to said distal end of said first dowel, wherein said anchor has a portion with a larger cross-sectional area than said first dowel.

17. The connector of claim 11, further comprising a fourth plate connected between said distal and said proximal ends of said first and second dowels, wherein said fourth plate is oriented substantially perpendicular to said third plate.

18. A connector for joining two concrete structures, comprising:
a chamber connected to a first sleeve and to a second sleeve, wherein said chamber has an opening at an upper end;
a first dowel positioned in said first sleeve such that said first sleeve constrains movement of said first dowel in one direction;
a second dowel positioned in said second sleeve such that said second sleeve constrains movement of said second dowel in the same direction as said first dowel, wherein proximal ends of said first and second dowels extend into said chamber and opposing distal ends of said first and second dowels extend out of said first and second sleeves, and said distal ends are configured to extend across a gap from one concrete structure to another concrete structure; and
a lock device that is configured to pass through said opening and into said chamber to selectively connect to a first lock feature of said first dowel and a second lock feature of said second dowel to secure said proximal ends of said first and second dowels within said chamber;
wherein said lock device comprises a plate with a slot extending upwardly into an outer perimeter of said plate and a pin extending downwardly from said plate into said slot, wherein said first and second locking features are each a recess and an aperture through said first and second dowel, and an edge of said slot extends into at least a portion of said recesses of said first and second dowels, and said pin extends through said apertures of said first and second dowels to selectively connect said plate to said first and second dowels.

* * * * *